United States Patent
Phelan et al.

(10) Patent No.: US 6,606,571 B2
(45) Date of Patent: Aug. 12, 2003

(54) MICROWAVE FLOW SENSOR FOR A HARVESTER

(75) Inventors: James Joseph Phelan, Bettendorf, IA (US); Donald L. Goodrich, Waterloo, IA (US); Frederick W. Nelson, Waukee, IA (US); Mark Rentz, Torrance, CA (US)

(73) Assignee: Deere & Company, Moline, IL (US)

( * ) Notice: Subject to any disclaimer, the term of this patent is extended or adjusted under 35 U.S.C. 154(b) by 91 days.

(21) Appl. No.: 09/976,692

(22) Filed: Oct. 12, 2001

(65) Prior Publication Data

US 2003/0074143 A1 Apr. 17, 2003

(51) Int. Cl.$^7$ .............................. G01F 1/00; G01F 7/00; G06F 19/00
(52) U.S. Cl. ................................. 702/45; 239/1; 239/3; 239/69; 460/119; 343/700; 343/853
(58) Field of Search ................................ 702/45; 239/1, 239/3, 69; 343/700, 853; 460/119

(56) References Cited

U.S. PATENT DOCUMENTS

| | | | | |
|---|---|---|---|---|
| 4,467,961 A | * | 8/1984 | Coffee et al. .................. 239/1 |
| 4,580,721 A | * | 4/1986 | Coffee et al. .................. 239/3 |
| 4,629,164 A | * | 12/1986 | Sommerville ................. 239/69 |
| 5,484,336 A | * | 1/1996 | McConnell .................. 460/119 |
| 6,492,949 B1 | * | 12/2002 | Breglia et al. ....... 343/700 MS |
| 2002/0163478 A1 | * | 11/2002 | Pleva et al. ................. 343/853 |
| 2003/0011519 A1 | * | 1/2003 | Breglia et al. ....... 343/700 MS |

* cited by examiner

Primary Examiner—John Barlow
Assistant Examiner—Aditya S Bhat

(57) ABSTRACT

A flow sensor for use in a harvester is disclosed. The flow sensor has a microwave transceiver for transmitting a microwave signal and receiving a reflected microwave signal, an in-phase mixer electrically connected to the microwave transceiver for combining the transmitted microwave signal and the reflected microwave signal and outputting an in-phase Doppler signal, a quadrature mixer electrically connected to the microwave transceiver for combining the transmitted microwave signal and a delayed reflected microwave signal and outputting the quadrature Doppler signal, and an electronic circuit electrically connected to the in-phase mixer and the quadrature mixer and having a flow rate output.

18 Claims, 6 Drawing Sheets

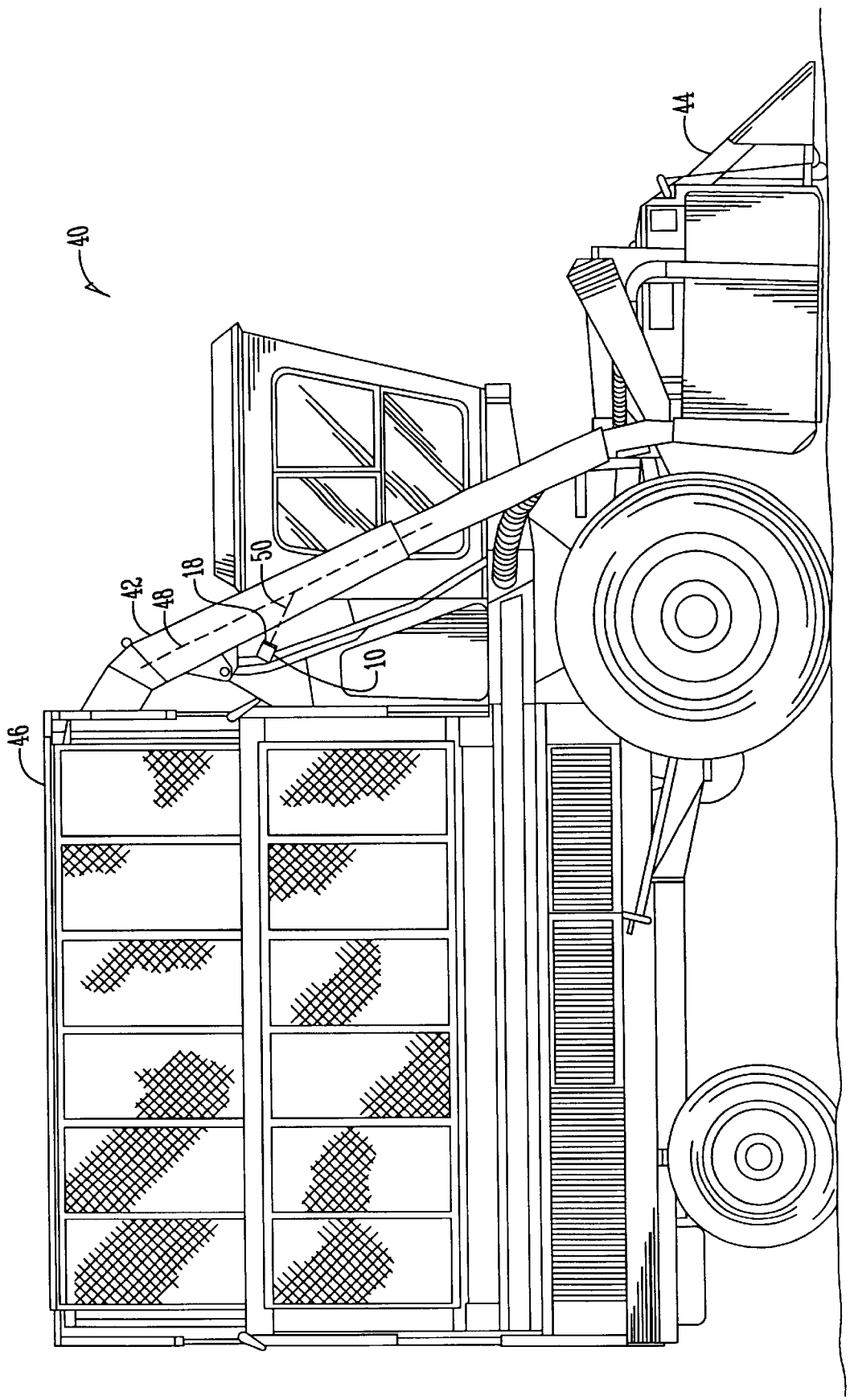

MICROWAVE FLOW SENSOR FOR A HARVESTER

BACKGROUND OF THE INVENTION

1) Field of the Invention

The present invention relates generally to flow sensors for harvestors, and more specifically, to an improved microwave flow sensor for a harvestor.

2) Related Art

Different attempts have been made at means and methods for detecting flow rates in harvesters. These attempts are discussed in the context of measuring flow rate of cotton on a cotton harvester, but at least some of the same problems are present in the harvesting of other types of crops. One problem with other flow rate sensors, including flow rate sensors that may use microwave signals, is the accuracy of the measured flow rate. This can be particularly important in precision agriculture applications or other applications that may require an accurate measurement of the flow rate of cotton or grain. For example, in precision agriculture applications such as yield monitoring and mapping, it is crucial to have accurate measurements of yield. As yield rates can be computed from flow rates, it is crucial to have accurate flow rates.

Another problem with the flow rate measurements in prior art devices is that differences in the velocity of the flow in material cause the measured flow rate to deviate from the actual flow rate. One cause of these differences in the velocity of flow is the lack of uniformity in air velocity from one duct to the next, a duct being the structure through which harvested material flows.

Yet another problem with prior art sensors is that they often require periodic calibration to compensate for drift. This drift includes changes in the velocity of the flowing material.

A further problem with prior art flow sensors used in harvestors is inaccuracy due to the effect of stationary vibrating surfaces. Due to vibrations, such as when a flow sensor is used to measure the flow of a material in a duct on a harvester, there are inaccuracies in the detection of the moving material. Some methods convert time domain information to the frequency domain. In these prior art applications, one prior art method of overcoming this problem of vibration has been to set an arbitrary cut off frequency to separate the effects of the stationary vibrating surfaces from those of moving cotton. This creates inaccurate measurements when the spectra of the flowing material and that of the machine vibrations overlap.

A problem with prior art cotton flow sensors is that using a cotton flow sensor in close proximity to dry cotton can result in damage to the electronic components of the sensor due to high electric fields that are sometimes generated around the duct in dry conditions as the flowing cotton rubs inside of the duct. Therefore problems remain, and there is a need for an improved cotton flow sensor.

BRIEF SUMMARY OF THE INVENTION

It is therefore an object of the present invention to provide an improved harvester flow sensor that improves upon the state of the art.

It is another object of the present invention to provide a harvestor flow sensor that provides accurate and consistent flow measurement.

It is a further object of the present invention to provide a cotton flow sensor that allows sufficient separation between electronic components and cotton flow that the high electric fields sometimes generated by flowing cotton and dry conditions do not damage the electronic components.

A further object of the present invention is to provide a flow sensor that compensates for variations in the velocity of the flowing material.

Yet another object of the present invention is to provide a harvestor flow sensor that is not impaired by the effects of stationary vibrating surfaces.

A still further object of the present invention is to provide a flow sensor suitable for use on a harvester.

A harvester flow sensor of the present invention permits the sensing of flow rate of cotton, grain or other crops within a duct of a harvester. The flow sensor includes a microwave transceiver attached to the harvester for transmitting a microwave signal and receiving a reflected microwave signal. An in-phase mixer is electrically connected to the microwave transceiver for combining the transmitted microwave signal and the reflected microwave signal, and outputting an in-phase Doppler signal. A quadrature mixer is electronically connected to the microwave transceiver for combining the transmitted microwave signal and a delayed reflected microwave signal and outputting a quadrature Doppler signal. The present invention also provides for filtering the DC components of the Doppler signals. By filtering and sampling these components, transmit power variations and in-phase and quadrature channel differences are compensated for.

An electronic circuit is electrically connected to the filtered outputs of the in-phase mixer and the quadrature mixer and has a flow rate output. The electronic circuit may contain a digital signal processor which includes instructions for sampling the in-phase Doppler signal and the quadrature Doppler signal and computing a Fast Fourier Transform.

The Fast Fourier Transform is computed on the set of complex numbers formed from the combination of the samples of the in-phase Doppler signal and the quadrature Doppler signal in order to produce a frequency domain spectrum having corresponding amplitude components and phase components. From this amplitude spectrum a power spectrum is computed. By multiplying the power components with their corresponding frequencies, a flow rate is calculated.

In this manner the present invention provides advantages that include accuracy and consistency of flow rate measurements.

BRIEF DESCRIPTION OF THE DRAWINGS

FIG. 2A is a diagram of a harvester configured with a flow sensor according to the present invention.

DESCRIPTION OF THE PREFERRED EMBODIMENT

Figure 1:
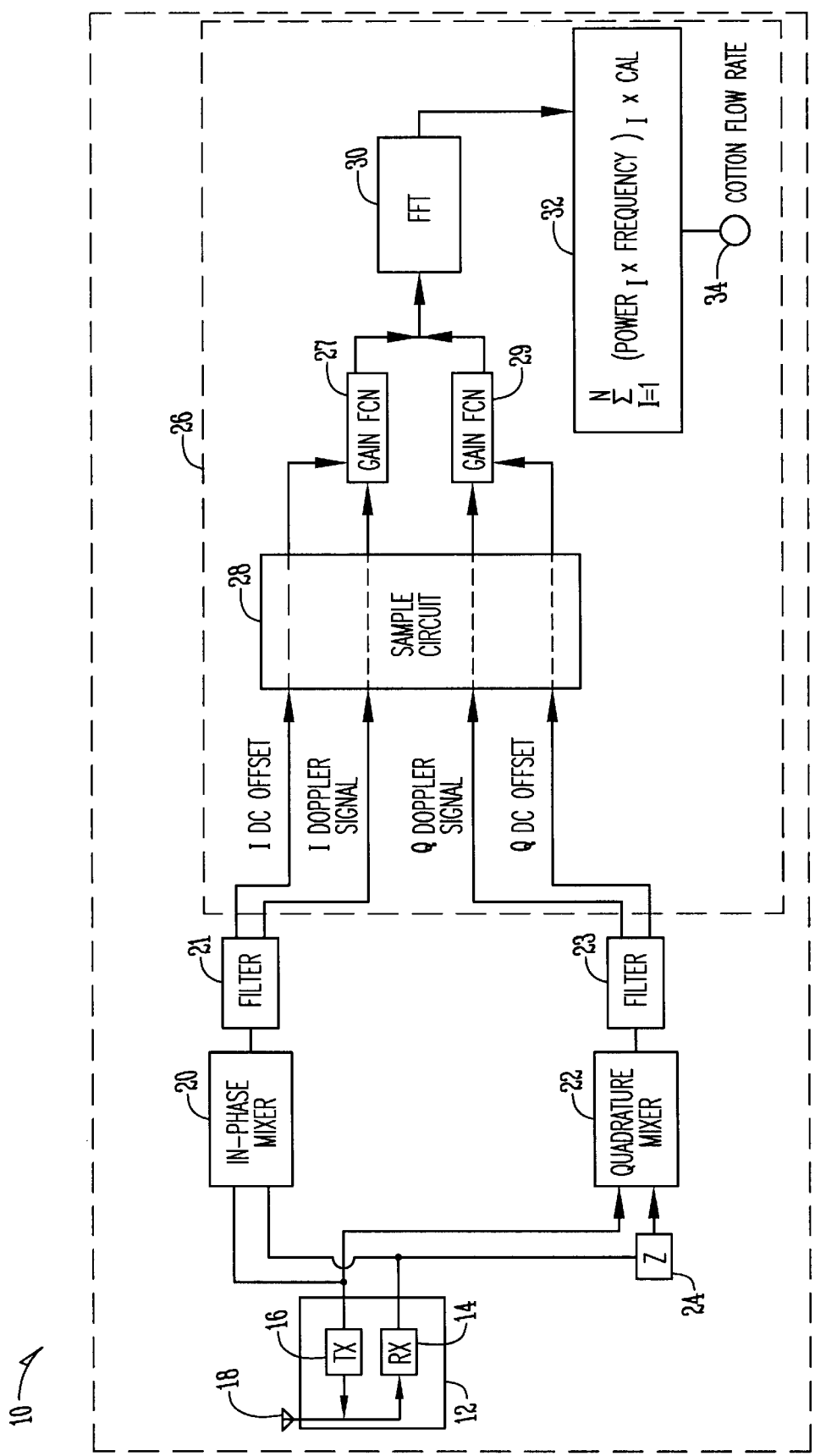
FIG. 1 is a block diagram of the present invention.

FIG. 1 shows a block diagram of the flow sensor 10 of the present invention. The flow sensor 10 includes a microwave transceiver 12. The microwave transceiver 12 is adapted to transmit and receive microwave signals. The microwave transceiver 12 may include a receiver portion 14 and a transmitter portion 16 placed within the same housing as shown or a receiver 14 and transmitter 16 that are otherwise separated. The microwave transceiver 12 includes an antenna 18. The antenna 18 is used to transmit and/or receive microwave signals. The present invention contemplates that both the receiver portion 14 and the transmitter portion 16 may share a single antenna or may use separate antennas. Preferably, the antenna 18 of the transceiver 12 has a narrow, well-defined pattern. This allows the antenna to be directed at the flowing material while remaining less susceptible to noise. The sensor 10 is positioned at a sufficient distance from a duct containing flowing material such as cotton or grain such that the entire width of the duct is contained within the beam of the antenna.

The transceiver 12 is electrically connected to an in-phase mixer 20 and a quadrature mixer 22. In this configuration, the sensor 10 is aimed at a microwave transparent duct carrying moving material. The transceiver 12 transmits a signal towards the duct and receives reflections off of reflecting surfaces in its field of view, including the material, parts of the duct, and various other surfaces.

The in-phase mixer 20 is electrically connected to the microwave transceiver 12 and combines the transmitted microwave signal and the reflected microwave signal as received. The in-phase mixer 20 then outputs an in-phase Doppler signal.

The quadrature mixer 22 is also electrically connected to the microwave transceiver 12. The quadrature mixer 22 combines the transmitted microwave signal and a delayed reflected microwave signal. The delay of the reflected microwave signal is shown in FIG. 1 by the delay 24. The quadrature mixer 22 outputs a quadrature Doppler signal.

The in-phase mixer 20 and the quadrature mixer 22 are each electrically connected to a filter. In-phase mixer 20 is electrically connected to filter 21 while quadrature mixer 22 is electrically connected to filter 23. The filters separate out the DC offset components of the mixer output signals. The DC offset of each mixer output signal is proportional to the product of the transmit power and the receive sensitivity of the mixer. Therefore, this filtering process permits variations in transmit power and receive sensitivity to be compensated for.

The in-phase mixer 20 and the quadrature mixer 22 in combination make it possible to measure the signed velocity (both the direction and magnitude) of a reflector that reflects the transmitted microwave signal.

The reflector of interest is the material within the duct such as cotton or grain. The in-phase mixer 20 and the quadrature mixer 22 are electrically connected to an electronic circuit 26. The electronic circuit 26 may be implemented in numerous manners, including through use of an intelligent control. One example of an intelligent control is a digital signal processor. The electronic circuit 26 may include a sample circuit 28 which is integrated into the intelligent control. The sample circuit 28 samples the in-phase (I) Doppler signal from the filter 21 of the in-phase mixer 20 and the quadrature (Q) Doppler signal from the filter 23 of the quadrature mixer 22. After each sampling operation, the I and Q Doppler samples are combined to form the real and imaginary components of a complex number. These complex numbers are sequentially grouped into blocks of length N. N is a power of two, typically 128. An N-point complex Fast Fourier Transform (FFT) is computed on each block. This produces a frequency domain spectrum of N complex numbers, each of which defines the amplitude and phase of one frequency component of the original block of N samples. The sum of the squares of the real and imaginary parts of each frequency component represents the power of that frequency component. The frequencies represented in this spectrum are evenly distributed over the range of −Fs/2 to +Fs/2, where Fs is the sampling frequency. The power of each of these components represents a quantity of reflecting material moving at a velocity proportional to the frequency of that component. The product of the component power and its frequency represents the flow rate of that quantity of material. The spectrum produced by stationary vibrating surfaces is symmetric about zero frequency. The spectrum produced by moving material is offset in the positive frequency direction if the material is moving toward the sensor and in the negative frequency direction if the material is moving away from the sensor. To compute the net flow rate of material for a block, the products of the component powers and their frequencies are summed. This is shown in block 32 of FIG. 1.

Block 32 also contains an optional calibration function which is used as a multiplier. The calibration function can be used to correct for non-linearity or other calibration purposes. This result is the net flow rate which may be accessible at an output 34. The present invention contemplates that the net flow rate may be displayed, stored, or otherwise used. This process may be repeated for the next N samples to generate an updated flow rate.

The electronic circuit 26 also is capable of compensating for transmit power variations and for I and Q channel sensitivity differences. The DC offset of each mixer output signal is proportional to the product of the transmit power and the receive sensitivity of the mixer. The sample circuit 28 samples the filtered DC offsets of the I and Q mixer output signals and then uses these samples, through the gain functions 27 and 29, to compensate for transmit power and receive sensitivity variations and for I and Q channel sensitivity differences.

Figure 3:
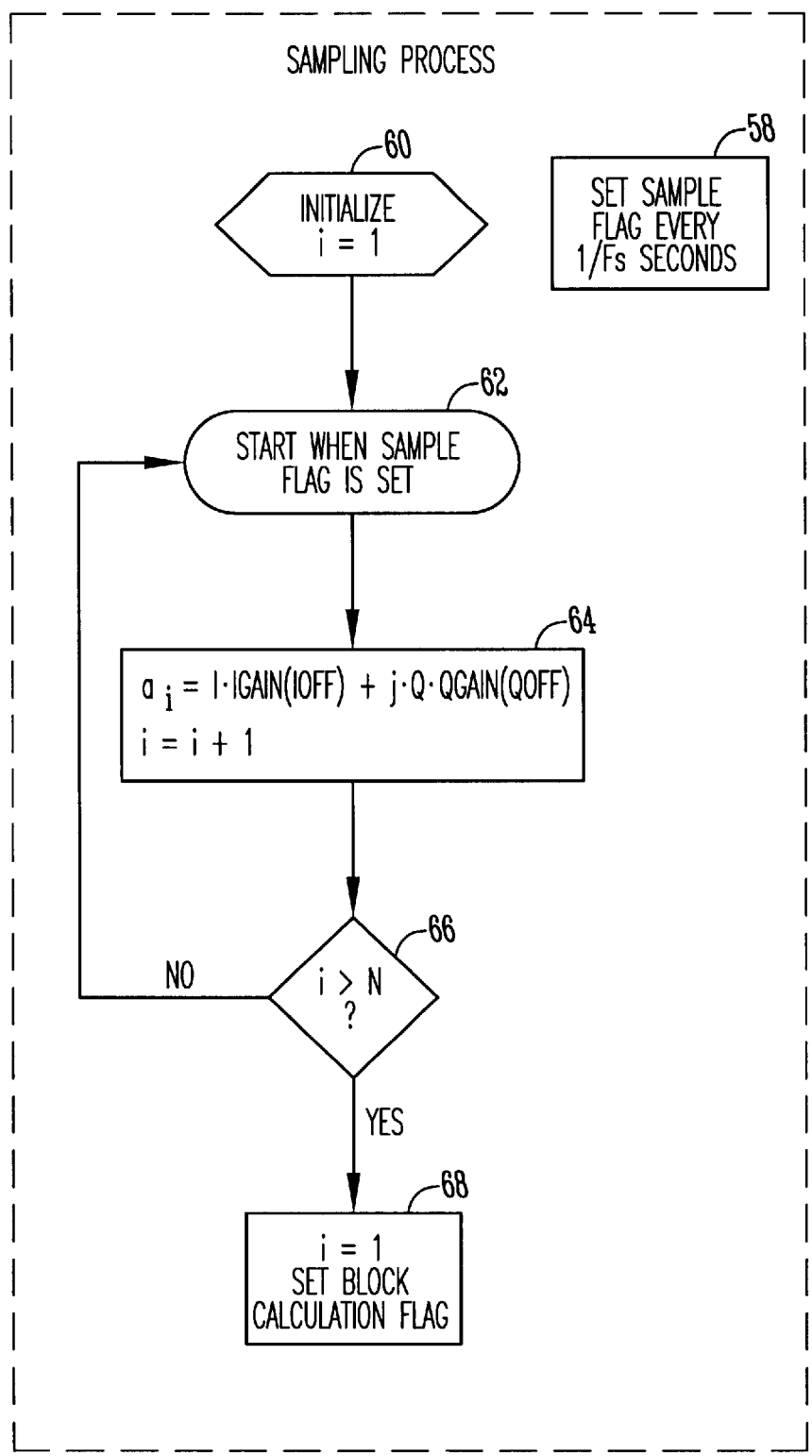
FIG. 3 is a flow diagram showing the sampling process according to the present invention.
Figure 4:
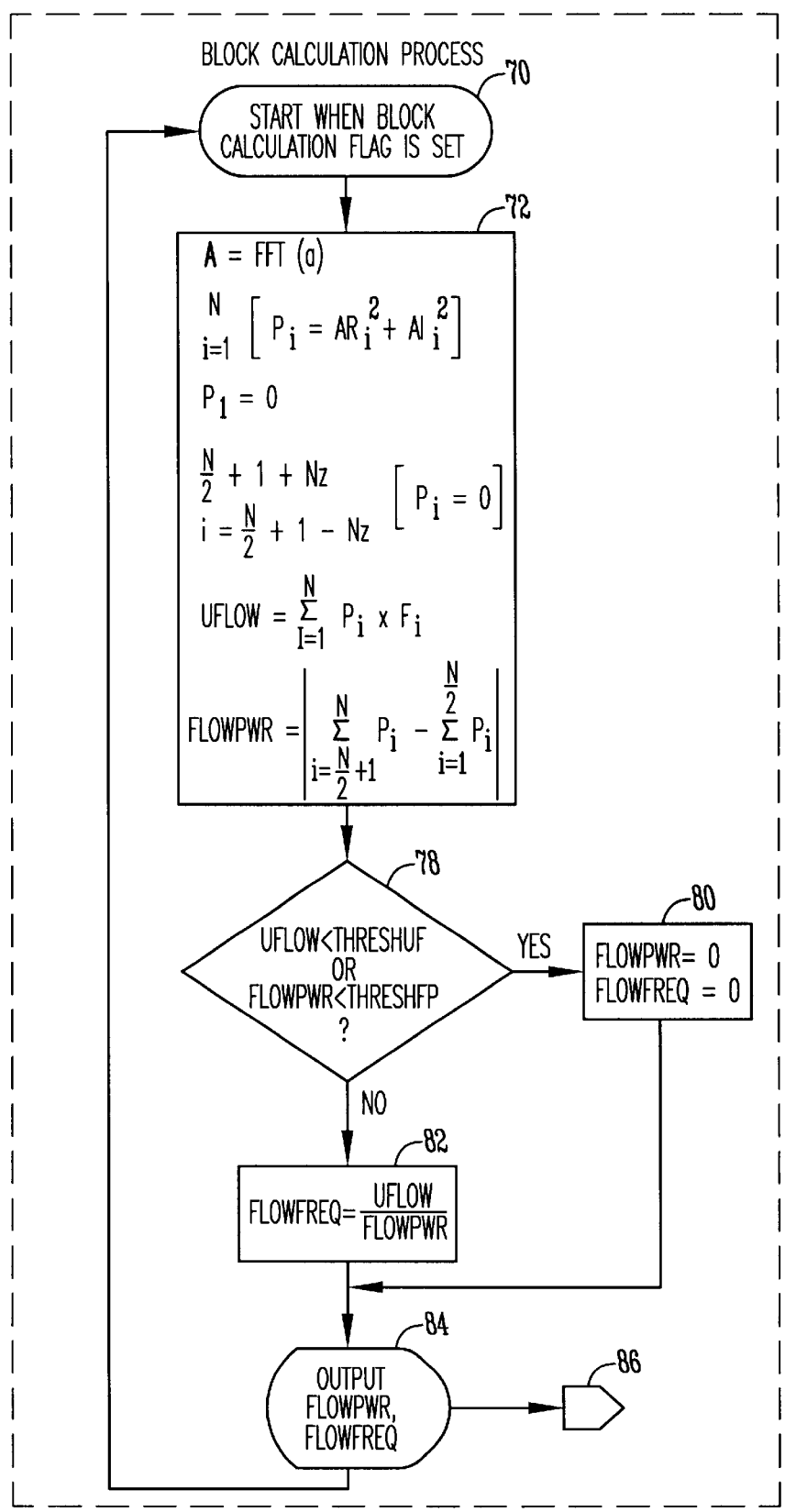
FIG. 4 is a flow diagram showing the block calculation process according to the present invention.
Figure 5:
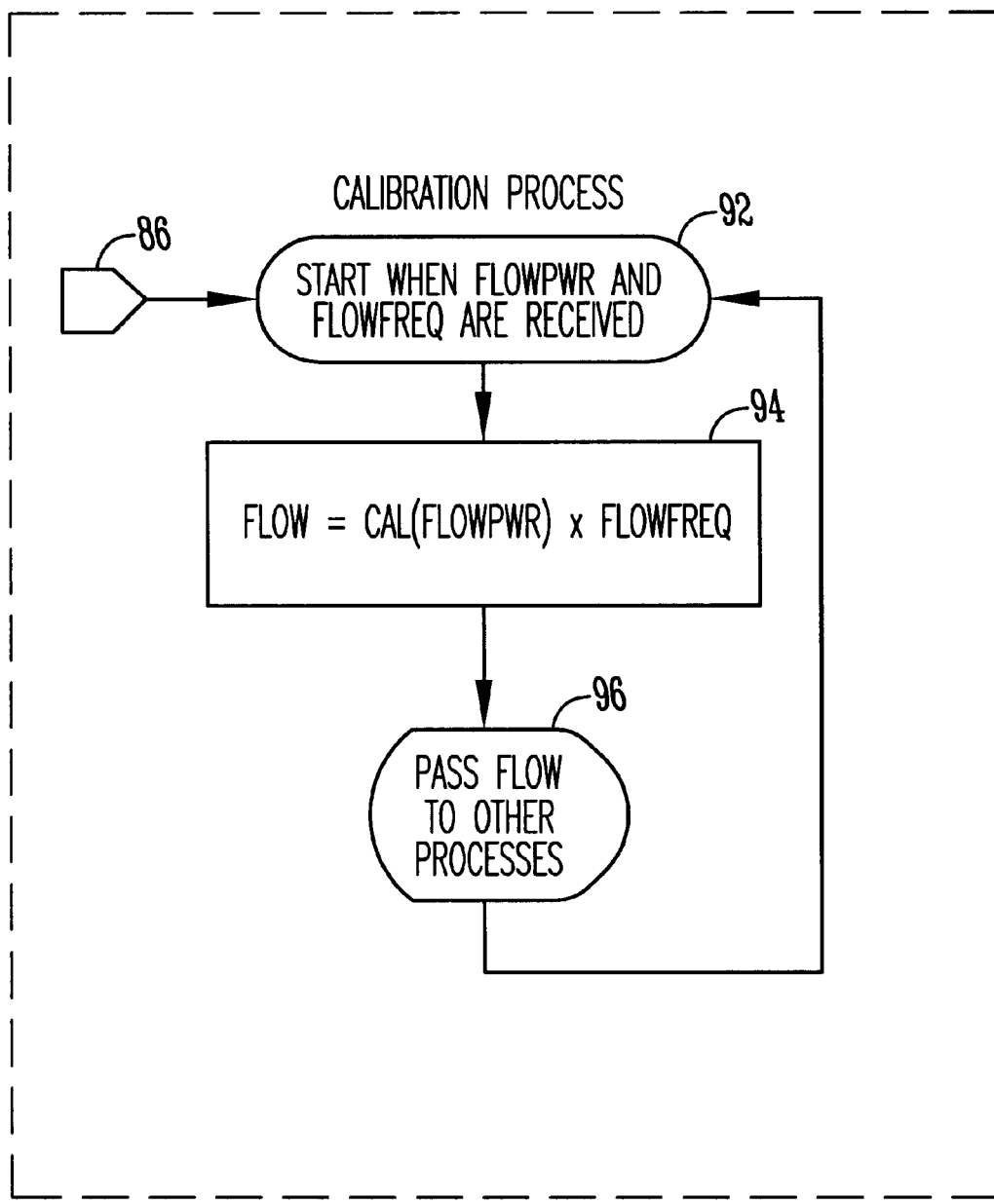
FIG. 5 is a flow diagram showing the calibration process according to the present invention.

FIGS. 3, 4 and 5 further show the steps that may be performed by the electronic circuit 26 of the present invention. In FIG. 3, the sampling process is shown. In step 58, a sampling flag is set every 1/Fs seconds. Fs is the rate at which the outputs of filters 21 and 23 are to be sampled. One sampling rate or sampling frequency that has been used is 10,000 samples per second, although the present invention contemplates that any number of rates may be used.

According to the sampling process, initialization takes place in step 60. In step 60, an index variable "i" is set. Then, in step 62, the process proceeds each time the sample flag has been set. In step 64, the complex value of an element of array "a" is set. The element set, $a_i$, is the element corresponding to the index variable i. Each element of this array is made up of a real and an imaginary component. The real component is the product of the sampled in-phase Doppler signal, I, and a gain function, IGAIN, which is dependent on the in-phase DC offset, IOFF. The imaginary component is the product of the imaginary unit, j, the sampled quadrature Doppler signal, Q, and a gain function, QGAIN, which is dependent on the quadrature DC offset, QOFF. The gain functions are used to compensate for variations in transmit power and receive sensitivity. Also according to step 64, the index variable i is incremented.

In step 66, a comparison is made. If i is greater than N, then it is known that the N element array is full and ready for block calculation. If the index variable i is not greater than N, the number of data values in the block, then steps 62, 64, and 66 are repeated until the N element array is filled.

Once the N element array is fully populated, the index variable i is reset and the block calculation flag is set to indicate that the N element array is full and ready for computation.

FIG. 4 is a flow diagram showing the block calculation process. In step 70, the process does not begin until the block calculation flag is set. Once the block calculation flag is set, then in step 72, a Fast Fourier Transform (FFT) is performed on array a having N complex values. The FFT is a mathematical operation that converts from the time domain to the frequency domain and is known to be computationally efficient. Of course the present invention also contemplates other transformations from the time domain to the frequency domain may be used.

Also in step 72, the powers associated with each of the frequency components of A are computed. Each of these computed powers is placed in P which is a N element array. A number of elements of P, Nz, on either side of the zero frequency element are set to 0 in order to reduce sensitivity to low frequency influences. Then, the uncalibrated flow rate is calculated by summing the products of the components of P and their corresponding frequencies. A power reflected from the flowing objects, FLOWPWR is also calculated as shown.

Then in step 78, the uncalibrated flow rate is compared to a threshold, THRESHUF. This threshold is set in order to reduce the sensitivity of the process to noise. Also, the power from flowing objects is compared to a threshold, THRESHFP. This threshold is set at a minimum value of the power from flowing objects that is required to calculate a reliable flow frequency. If the uncalibrated flow rate is less than its threshold, or the power from flowing objects is less than its threshold, then in step 80 the uncalibrated flow rate is set to 0 and the power from flowing objects is set to 0. If the uncalibrated flow rate is not less than its threshold and the power from flowing objects is not less than its threshold, then the flow frequency, FLOWFREQ, is calculated in step 82. The flow frequency is calculated by taking the quotient of the uncalibrated flow rate and the power from flowing objects. The output flow frequency and flow power are shown in step 84 with an output 86.

The threshold values are selected based upon the particular application or operating environment of the flow rate sensor. For example, where more noise is expected a greater threshold can be set to reduce the sensitivity to noise.

The calibration process is shown in FIG. 5. According to the present invention, the calibration process begins once the flow power, FLOWPWR, and flow frequency, FLOWFREQ, are received. Once received, in step 94, a calibrated flow rate, FLOW, is calculated. To calculate this flow rate, a calibration function is performed on the flow power to calibrate and/or correct. For example, this calibration function can correct for non-linearity. The output of this function is then multiplied by the flow frequency to yield the calibrated flow rate, FLOW. Once calculated, the flow rate, FLOW, is available to be output as needed as shown in step 96. For example, this flow rate can be used to calculate yields in a harvesting application.

Figure 2B:
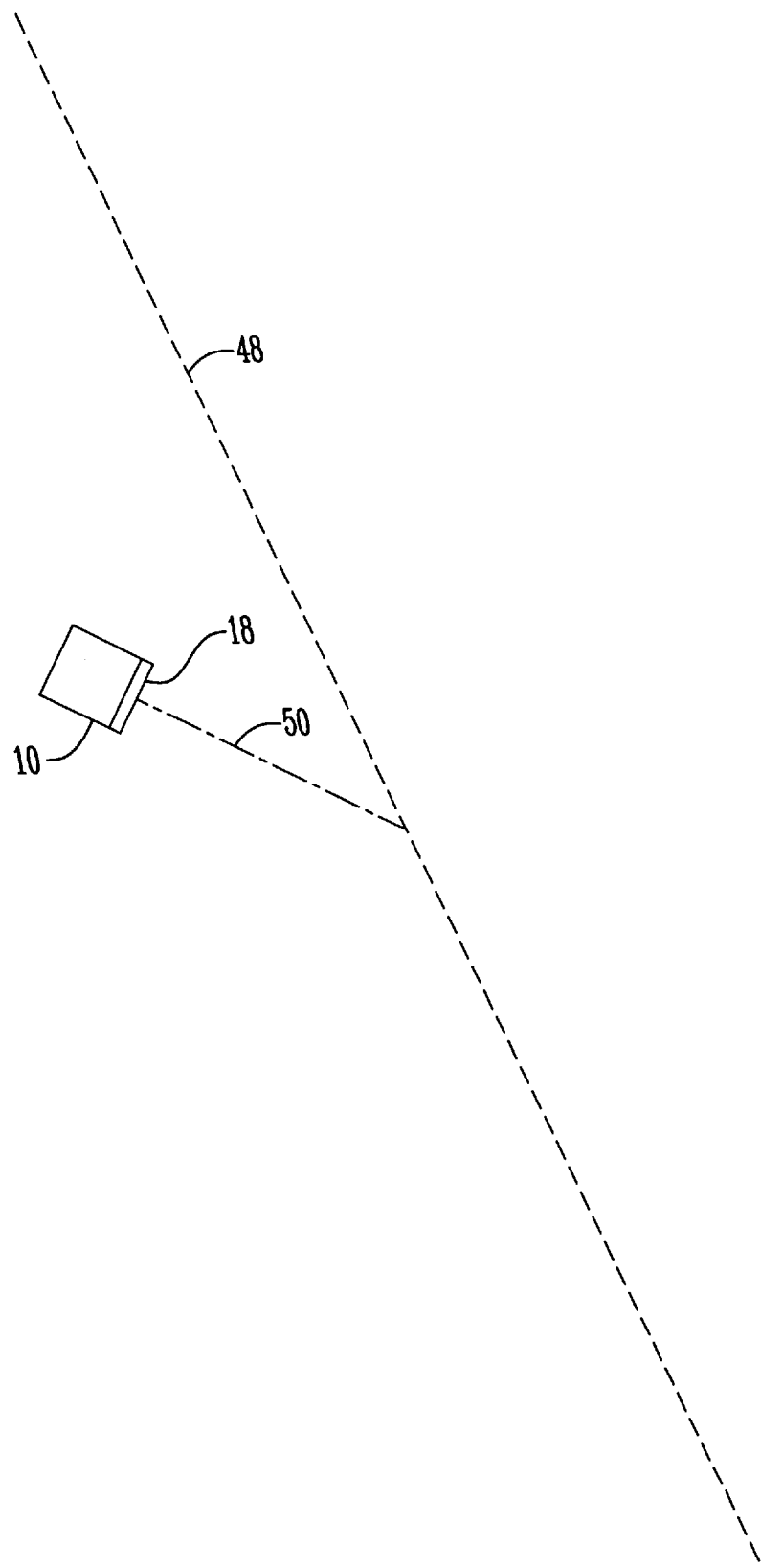
FIG. 2B is a diagram showing an enlarged view of the flow sensor of FIG. 2A.

FIGS. 2A and 2B shows the flow sensor of the present invention as adapted for use in a harvester 40. The sensor 10 is aimed at microwave transparent duct 42 carrying moving cotton. A line 50 extending from the axis of the antenna 18 passes through the center of the duct at a non-perpendicular angle with the duct 42 center line 48 as best shown in the detail view of FIG. 2B. The sensor 10 transmits a signal towards the duct and receives reflections off all reflecting surfaces in its field of view. The reflecting surfaces include cotton, parts of the duct 42, and various other surfaces of the machine. The present invention contemplates that the cotton flow rate may be measured in different locations on the machine and the sensor 10 may also be positioned accordingly. Further, although a cotton harvester is shown, the present invention is not limited merely to cotton, but rather the present invention can be used in harvesting of grains, and other agricultural materials.

The antenna 18 has a narrow, well-defined pattern. The sensor 10 is positioned sufficiently far from the duct that the entire width of the duct 42 is contained within the beam and all moving pieces of cotton are viewed at nearly the same angle with respect to the axis of the cotton flow sensor 10. In this way the cotton flow sensor detects the velocities and reflectivities of all moving pieces of cotton uniformly. An additional benefit of mounting the cotton flow sensor 10 at appropriate distance from the duct 42 is that the cotton flow sensor 10 is physically removed from the high electric fields that are sometimes generated around the duct 42 in dry conditions as the flowing cotton rubs the inside of the duct. This high field can be very damaging to electronic components.

Therefore, in this embodiment, as cotton harvester 40 harvests cotton, cotton from the row unit 44 may be transported up the duct 42 to the basket 46. The flow rate is then measured.

Therefore, a novel flow sensor having advantages that include improved accuracy has now been disclosed. It should be apparent that the present invention contemplates numerous variations in the placement of the flow sensor when placed on a harvesting unit, the type of crop being harvested, the implementation of the function of the electronic circuit, the calibration and correction functions used, and other variations such as are within the spirit and scope of the invention.

What is claimed is:

1. A flow sensor for sensing flow rate of moving crop material within a duct of a harvester, comprising:
    a microwave transceiver attached to the harvester for transmitting a transmitted microwave signal and receiving a reflected microwave signal;
    an in-phase mixer electrically connected to the microwave transceiver for combining the transmitted microwave signal and the reflected microwave signal and outputting an in-phase Doppler signal;
    a quadrature mixer electronically connected to the microwave transceiver for combining the transmitted microwave signal and a delayed reflected microwave signal and outputting a quadrature Doppler signal; and
    an electronic circuit electrically connected to the in-phase mixer and the quadrature mixer and having a flow rate output.

2. The flow sensor of claim 1 wherein the electronic circuit further comprises an intelligent control.

3. The flow sensor of claim 2 wherein the intelligent control is a digital signal processor.

4. The flow sensor of claim 2 wherein the intelligent control includes a set of instructions for sampling the in-phase Doppler signal and the quadrature Doppler signal and computing an FFT.

5. A flow sensor system for sensing flow rate of moving crop material, comprising:
    a microwave transparent duct for containing flowing crop material;
    a microwave transceiver for transmitting a transmitted microwave signal towards the transparent duct and receiving a reflected signal;
    an in-phase mixer electrically connected to the microwave transceiver for combining the transmitted microwave signal and the reflected microwave signal and outputting an in-phase Doppler signal;
    a quadrature mixer electronically connected to the microwave transceiver for combining the transmitted microwave signal and a delayed reflected microwave signal and outputting a quadrature Doppler signal; and
    an electronic circuit electrically connected to the in-phase mixer and the quadrature mixer and having a flow rate output.

6. The flow sensor system of claim 5 wherein the microwave transceiver includes a narrow beam antenna.

7. The flow sensor system of claim 5 wherein the electronic circuit further comprises an intelligent control.

8. The flow sensor system of claim 7 wherein the intelligent control includes a set of instructions for sampling the in-phase Doppler signal and the quadrature Doppler signal and computing a FFT.

9. The flow sensor system of claim 5 further comprising a harvester wherein the transparent duct is mounted on the harvester.

10. The flow sensor of claim 5 wherein the crop material is selected from the set comprising cotton and grain.

11. A method of measuring crop material flow rate within a duct comprising:

transmitting a first microwave signal towards the crop material duct;

receiving a reflected microwave signal;

mixing the first microwave signal and the reflected microwave signal to produce an in-phase Doppler signal;

mixing the first microwave signal and a delayed reflected microwave signal to produce a quadrature Doppler signal;

sampling the in-phase Doppler signal and the quadrature Doppler signal to form a set of complex numbers;

computing a frequency domain spectrum having corresponding amplitude components and phase components;

computing a frequency domain power spectrum; and summing the products of the components of the power spectrum and their corresponding frequencies to produce a crop material flow rate.

12. The method of claim 11 further comprising summing a plurality of flow rates to compute a net crop material flow rate.

13. The method of claim 11 further comprising compensating the in-phase Doppler signal with the DC offset of the in-phase mixer.

14. The method of claim 11 further comprising compensating the quadrature Doppler signal with the DC offset of the quadrature mixer.

15. The method of claim 11 further comprising comparing the flow rate to a threshold.

16. The method of claim 11 further comprising applying a calibration function to the flow rate.

17. The method of claim 11 wherein the duct is attached to a harvester.

18. The method of claim 17 wherein the crop material is cotton and the harvester is a cotton harvester.

* * * * *